United States Patent [19]

Oren

[11] Patent Number: 5,051,046

[45] Date of Patent: Sep. 24, 1991

[54] SEMI TRAILER CONVERTIBLE FOR HAULING AUTOMOBILES

[75] Inventor: David D. Oren, St. Paul, Minn.

[73] Assignee: Transportation Concepts, Inc., Eagan, Minn.

[21] Appl. No.: 450,417

[22] Filed: Dec. 14, 1989

[51] Int. Cl.$^5$ .............................................. B60P 3/08
[52] U.S. Cl. ...................................... 410/29.1; 410/26
[58] Field of Search .................... 410/26, 27, 29, 29.1; 414/227, 233, 234, 235, 495, 498, 608

[56] References Cited

U.S. PATENT DOCUMENTS

| 1,697,807 | 1/1929 | Blackmore | 410/29 X |
|---|---|---|---|
| 2,107,274A | 4/1983 | Jones et al. | |
| 2,384,965 | 9/1945 | Reid | 296/28 |
| 2,587,456 | 2/1952 | Francis | 296/1 |
| 2,636,772 | 4/1953 | Bridge | 296/1 |
| 2,668,734 | 2/1954 | Bridge | 296/1 |
| 2,834,631 | 5/1958 | Taraldsen | 296/1 |
| 2,883,231 | 4/1959 | Dawson | 296/1 |
| 3,084,970 | 4/1963 | Day | 410/29.1 |
| 3,255,995 | 6/1966 | Bartlett | 254/86 |
| 3,292,802 | 12/1966 | Hutchinson | 214/506 |
| 3,303,950 | 2/1967 | Jones | 214/505 |
| 3,675,795 | 7/1972 | Dluhy | 214/16.1 |
| 4,019,643 | 4/1977 | Kampman et al. | 214/505 |
| 4,047,699 | 9/1977 | Wisdom | 254/86 |
| 4,074,822 | 2/1978 | Chisum | 214/152 |
| 4,413,943 | 11/1983 | Liljestrom | 414/475 |
| 4,701,086 | 10/1987 | Thurndyke | 410/26 |
| 4,768,916 | 9/1988 | Gearin et al. | 414/498 |

OTHER PUBLICATIONS

Article entitled "Time to Get S.M.A.R.T.?", *Railroad Age*, Apr. 1990.
Exhibit A, Three photos showing Leaseway Trailer of Columbus, Ohio.
Exhibit B, Magazine article by James Mateja discussing Ford testing robots for loading and delivery of vehicles.
Article, Hauling Cars Undercover, Heavy Duty Trucking, Mar. 1990 Issue, p. 152.

*Primary Examiner*—David A. Bucci
*Assistant Examiner*—Craig Slavin
*Attorney, Agent, or Firm*—Merchant, Gould, Smith, Edell, Welter & Schmidt

[57] ABSTRACT

An enclosed semi trailer (10) is disclosed. Tracks (28) are provided for the support of an upper level of automobiles (17). A lower level of automobiles (17) are supported within pans (37). The tracks (28) are moved by means of support arms (29) which are powered by rams (23). The tracks (28) and support members (29) and cross frame members (26) fit within cutout portions (37, 38, 39) in the floor (25) so as to provide a continuous, smooth surface when general freight is being hauled.

11 Claims, 5 Drawing Sheets

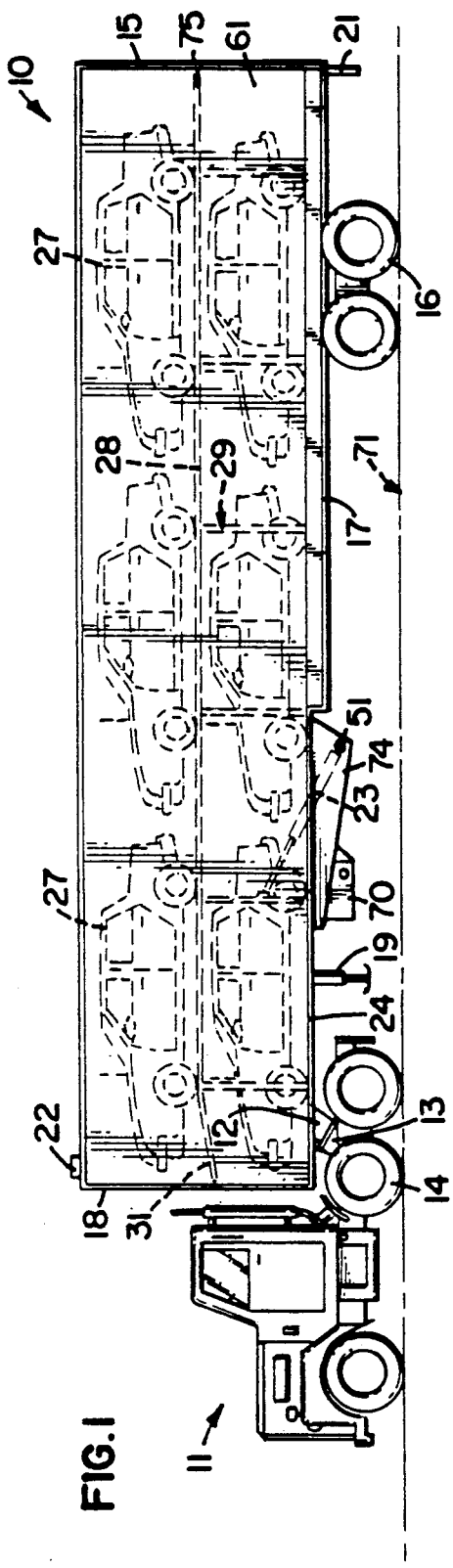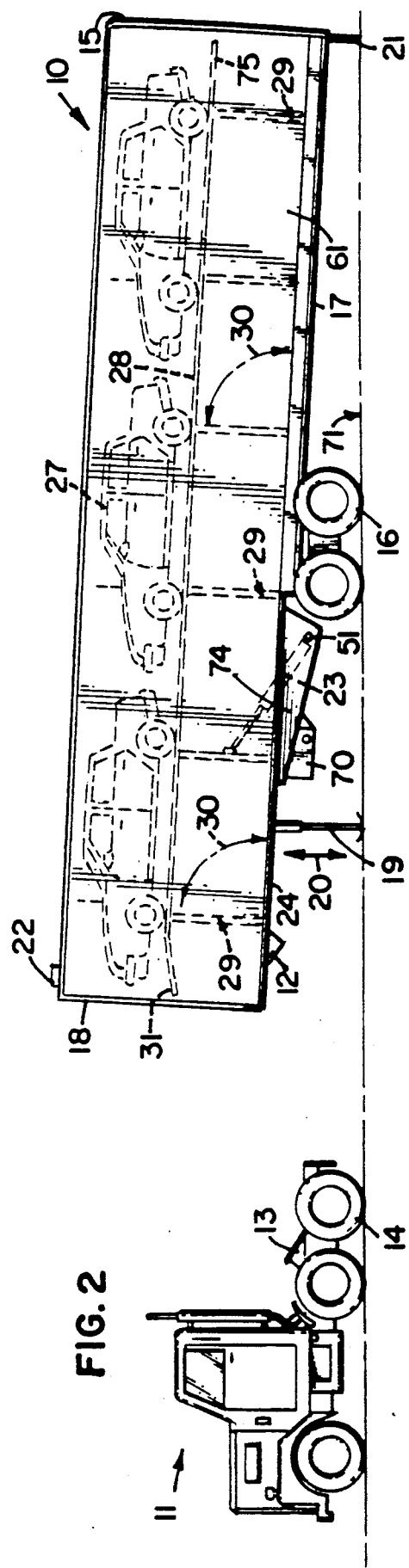

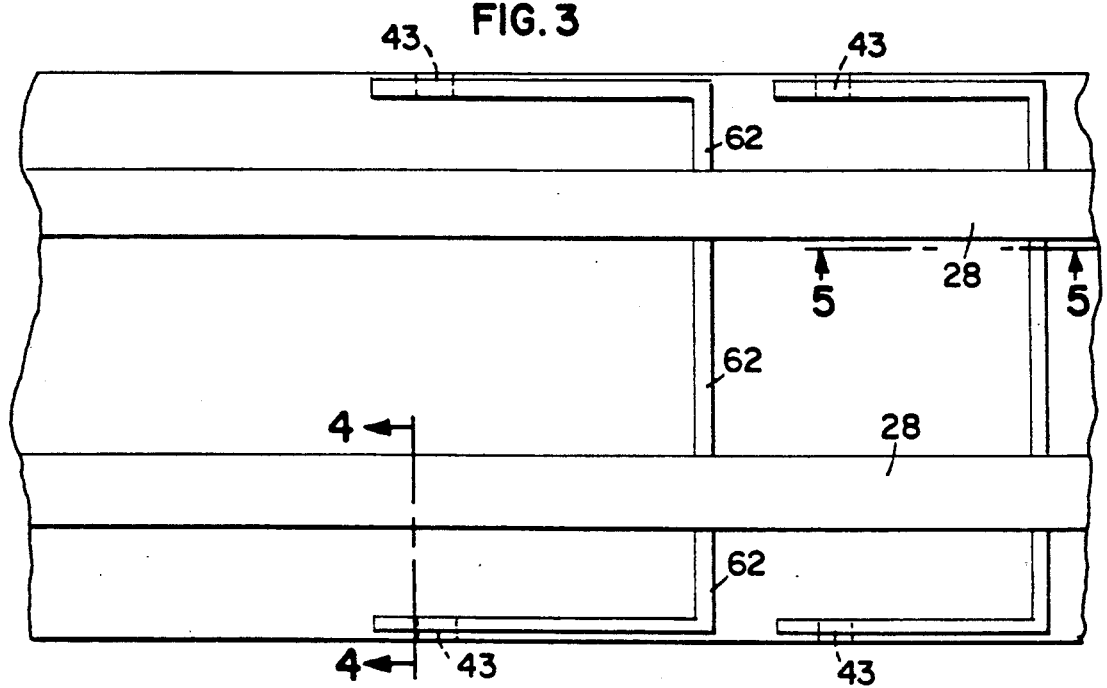
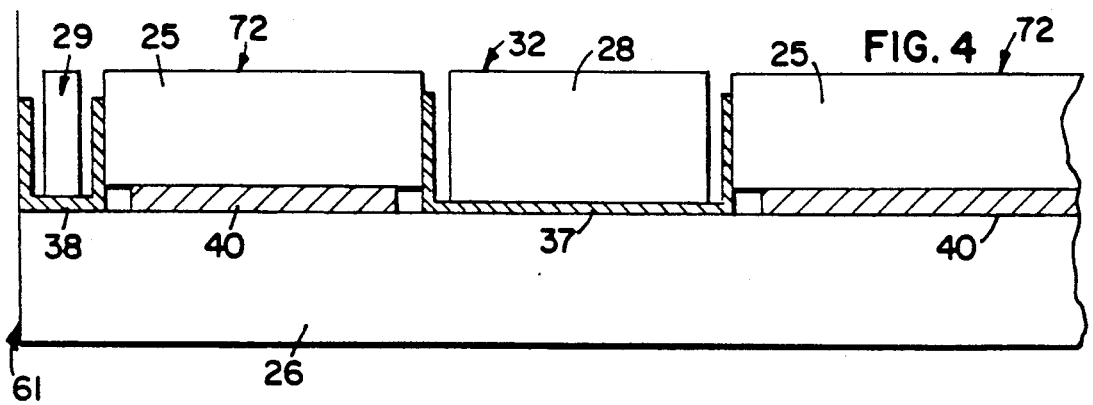

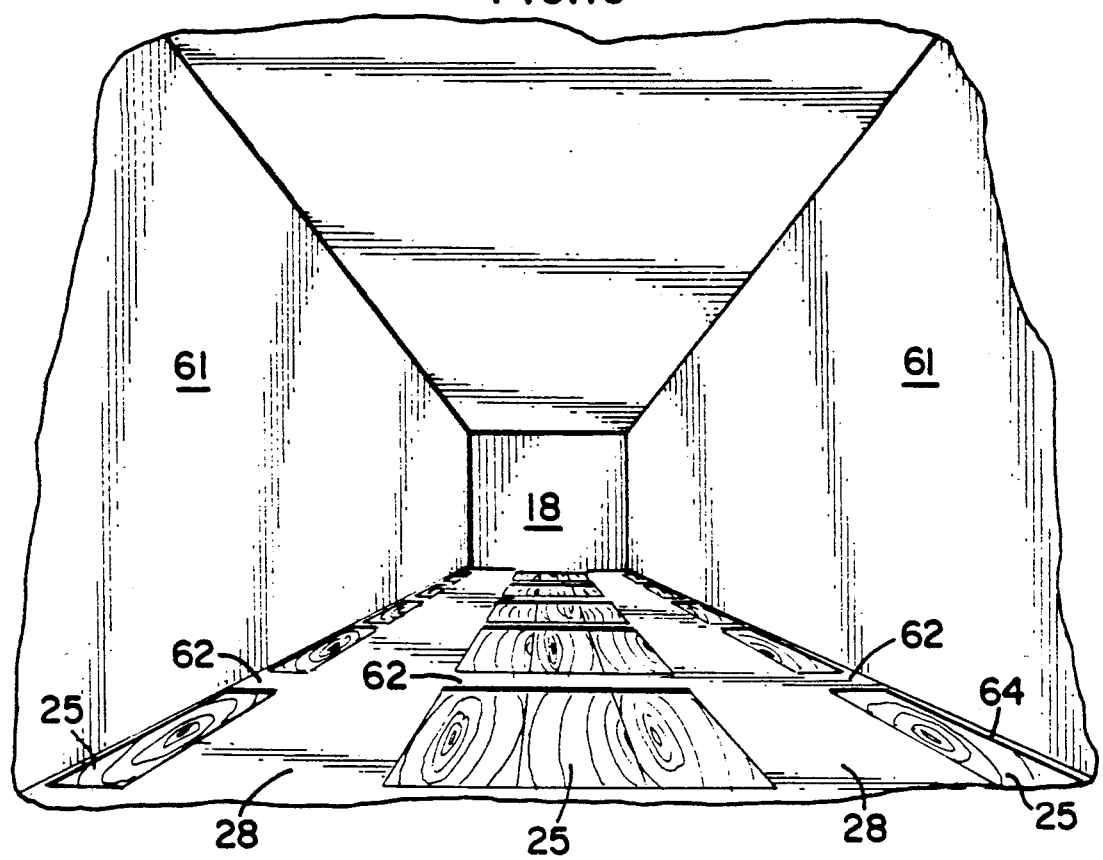

SEMI TRAILER CONVERTIBLE FOR HAULING AUTOMOBILES

FIELD OF THE INVENTION

The present invention relates to highway transport vehicles and, more particularly, to a dual-purpose highway vehicle which can be converted so as to be able to haul either a plurality of automobiles on two levels or a full volume of general freight.

BACKGROUND OF THE INVENTION

Currently, land transportation of automobiles takes two forms. Most commonly, rail cars designed to haul automobiles pick up the automobiles at the manufacturer's dock. The automobiles are then delivered to a hub. At the hub, they are unloaded from the rail cars and loaded onto specialized automobile-hauling trucks, which then make the final delivery to the automobile dealership. The other common way of hauling automobiles is to utilize specialized automobile-hauling trucks and trailers from the manufacturer directly to the dealer.

The trailers utilized to haul automobiles must meet special engineering and other requirements. These requirements are very different from the design requirements for highway vehicles which are designed to transport general freight. Consequently, two different types of vehicles have been developed for these two purposes, and neither type of vehicle is adapted to economically carry both kinds of loads. While operators of the general type of freight-carrying types of trucks or trailers endeavor and generally are able to arrange for payloads both going and coming on a particular trip, the automobile-carrying vehicles have not been able to do this. Instead, the car carriers often go out loaded and are obliged to return empty.

Consequently, auto-hauling trucking companies have high costs because of their high "deadhead" and low equipment utilization. Their trailers cannot be used for other types of freight. They incur a high percentage of empty to loaded miles because of their limited shipper base. Their freight rate must reflect those extra empty miles. Auto-hauling trucking companies experience a high deadhead ratio compared to other truckload carriers.

The specialized expensive equipment required by auto-hauling trucking companies also increases their costs and ultimately their freight rate. Automobile hauling trailers are complex and expensive to maintain. The tractors are specially designed with ramps. The tractors also use special fuel tanks, special towing hooks, hydraulic pumps, and other non-standard equipment. The auto hauling trailer's initial purchase price is 2 to 3 times higher than conventional vans.

Another problem with automobile-hauling tractors and trailers is their lack of protection from the elements. Due to the open design of automobile-hauling semi tractors and trailers, the automobiles they haul are not protected from vandalism, theft or accidental damage such as rock chips.

With the rail transportation method, rail cars are utilized which are designed especially for the purpose of hauling automobiles. These special rail cars are either open or shielded from vandalism, but are almost never totally enclosed. Because most general freight needs to be kept dry and isolated from the elements, the railroad cars used to haul automobiles on the front haul cannot be used on the return or backhaul trip to haul other freight, and thus they are rather unproductive. Moreover, even if automobile-hauling railroad cars were made waterproof, they would be difficult to utilize because the space provided is typically not a standardized size, and this presents problems when unloading and loading.

The cost of maintaining hub yards and the equipment to operate them is significant. Vandalism and theft regularly occur at hub yards. Automobiles must be unloaded from the rail cars at the hub yards, then reloaded into the specialized auto-hauling tractors and trailers. This process is slow, labor intensive, leads to handling damage, and is costly. The length of time in transit can be several weeks. Since the number and the value of the vehicles in transit is tremendous, this time delay also results in a substantial loss of operating profits for the automobile manufacturer.

The concept of semi trailers for carrying both general freight and automobiles is not new. For example, U.S. Pat. Nos. 2,668,734 and 2,636,772 disclose such trailers. However, the trailer designs described in these patents tend to compromise the payload capacity because of a decrease in the amount of interior width available and because of the significant weight of the design's components. In addition, these designs are relatively complicated, costly and require a relatively significant level of operator skill.

The present invention addresses these and other problems with currently-available trucks and trailers.

SUMMARY OF THE INVENTION

The present invention is a system for raising and lowering a deck section of a trailer, so as to either provide two levels for supporting cargo such as automobiles, or to provide a trailer with a continuous floor for hauling cargo such as dry freight. The trailer floor is sized and configured with cutout portions to accommodate the movable deck section when the deck section is in its lowered position. In the preferred embodiment, the deck section comprises a pair of parallel, longitudinal tracks which are able to support a plurality of automobiles. When the tracks are in their lowered position, the upper surface of the tracks is flush with the trailer's flooring. The deck sections or tracks are raised and lowered selectively by means of lift means, such as a plurality of support legs. The support legs are interconnected to power means, such as a hydraulic cylinder arrangement. In the preferred embodiment, the support legs have an upper arm and a lower arm which are in slidable engagement.

Another aspect of the invention is a method for loading a semi trailer with vehicles. The inventive method comprises the steps of loading a first layer of vehicles upon the parallel track sections; activating power means in order to lift the track sections and automobiles to a raised position; and loading a second, lower layer of vehicles within the trailer. An optional step in the inventive method is the sliding of the trailer's rear wheel assembly proximate a center portion of the trailer, and lifting the front end of the trailer so as to place the trailer's rear end proximate ground level to facilitate loading and unloading.

A primary advantage of the present invention is that productivity is increased by the reduction of empty miles, or trips in which the trailer contains no payload. Thus, the auto carrier of the present invention can transport automobiles in one direction and general freight in the opposite direction. This allows greater productivity from the auto carrier and increased profits for the auto hauler.

A further advantage of the present invention is a reduction in the in-transit time required to transport automobiles. Because the trailer of the present invention can be utilized for the entire trip between the manufacturer and the dealer, delays at a hub yard can be avoided. Delivering by truck is the fastest type of automobile transportation.

A further advantage of the present invention is that it offers a dry, enclosed, protective environment for automobiles. As automobile prices escalate, so does the need for more protection from the elements, theft, vandalism and rock chips. The completely enclosed trailer of the present invention meets automobile manufacturers' concerns for additional protection.

Yet another advantage of the present invention is that it is significantly less expensive than specialized automobile trailers. The present invention enables use of completely conventional tractors and involves the use of fairly conventional semi trailer construction.

Still another advantage of the present invention is that it provides a method of loading and unloading an enclosed semi trailer without use of a loading dock structure. Additionally, the loading can be accomplished with a lift device such as a forklift without an accompanying dock. This is particularly advantageous, since while loading will usually take place at a loading dock, an ever-increasing number of deliveries must be made where there is no loading dock structure. In addition, ground level loading and unloading is safer than above ground loading, thereby reducing the number of injuries resulting from falling out of the semi trailer or from dropping cargo.

Still another advantageous feature of the present invention is that the components of the trailer's lift mechanism and supporting framework are non-removably mounted inside the vehicle structure. This minimizes the complexity and labor time involved in converting the trailer between car-carrying to general freight-carrying, and also minimizes the likelihood of vandalism and pilferage.

These and various other advantages and features of novelty which characterize the invention are pointed out with particularity in the claims annexed hereto and forming a part hereof. However, for a better understanding of the invention, and its advantages, reference should be made to the drawings which form a further part hereof, and to the accompanying descriptive matter in which there is illustrated and described a preferred embodiment of the invention.

BRIEF DESCRIPTION OF THE DRAWINGS

In the drawings, in which like reference numerals and letters indicate corresponding parts throughout the several views:

FIG. 1 is a side, diagrammatic view of the trailer of the present invention, fully loaded;

FIG. 2 is a side, diagrammatic view of the trailer shown in FIG. 1, in its ground-level loading position and partially loaded;

FIG. 3 is a partially cutaway plan view of the trailer with the tracks and support legs in their lowered position;

FIG. 4 is a sectional view, taken at line 4—4 of FIG. 3, of the trailer's floor and support system;

FIG. 10 is a perspective view of the trailer illustrated in FIG. 11 in its lower position, as viewed from the rear.

DETAILED DESCRIPTION OF A PREFERRED EMBODIMENT OF THE INVENTION

Figure 5:
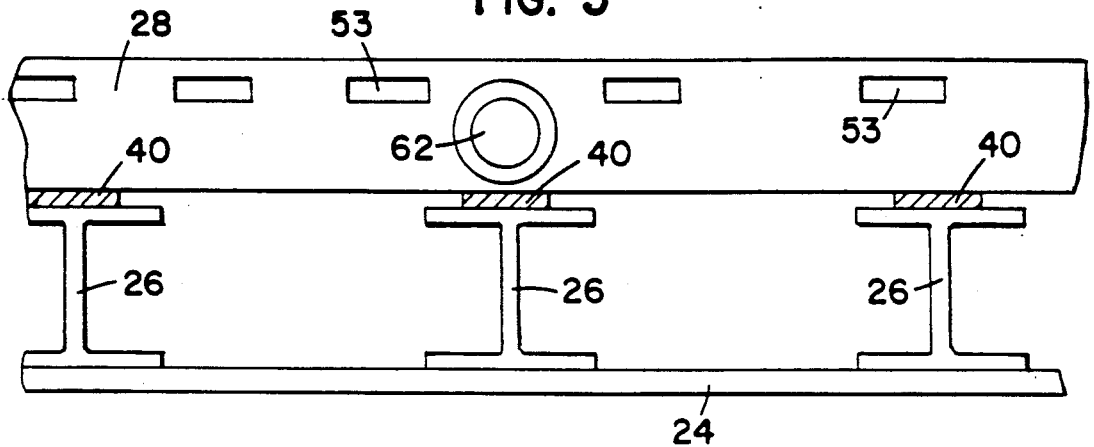
FIG. 5 is a sectional view, taken at line 5—5 of FIG. 3, of the trailer's floor and support system.

Referring to the drawings, the illustrated embodiment of the semi trailer 10 is interconnected to a tractor 11 by means of a fifth wheel engaging portion 12 which is adapted to rest upon a fifth wheel 13 at the rear of the tractor 11. The tractor 11 has drive wheels 14. The rear end 15 of the semi trailer 10 is supported by a wheel assembly 16. The wheel arrangement 16 will include a two-axle arrangement. Preferably, the tandem wheels 16 are smaller than standard size so as to allow for a maximum inside height in the rear end 15 of the trailer 10. The semi trailer 20 includes a door arrangement (not shown) at its back end 15, as is typical of most semi trailers.

In the preferred embodiment, the trailer 10 has a slide assembly 17 which enables the rear wheels 16 to slide in the forward direction, thus enabling the rear end 15 of the semi trailer 10 to be lowered to the ground 71, or proximate thereto. The semi trailer 10 is then loaded from the rear end 15. FIG. 1 illustrates the position of the tandem wheels 16 when the semi trailer 10 is in its normal, raised position. FIG. 2 illustrates the forward position of the wheels 16, wherein the rear end 15 of the trailer is lowered proximate ground level 71. In the alternative, a suitable dock structure or ramp structure could be utilized in the event that the sliding assembly 17 were not present to enable ground level loading.

Mounted in each of the opposing corners of the front end 18 are two extensible jack devices 19, the movement of the jack devices 19 being illustrated in the arrow 20. The jack devices 19 may be operated by any number of suitable methods and may be manually operated. In addition, the jack devices 19 may have any number of suitable configurations, for example, a piston/cylinder arrangement, a scissors type jack, a screw type jack, a ratchet type jack, etc. In addition, the jack devices 19 may be mounted in any suitable location.

The process of achieving the loading condition illustrated in FIG. 2 is as follows: the tandem wheels 16 are locked so as to be stationery by activating a suitable lever in the tractor's cab; the tractor 11 pushes the trailer 10 in the backward direction, thereby allowing the trailer 10 to move with respect to the wheel 16 by means of the sliding assembly 17; the wheels 16 are locked into their new position on the sliding assembly 17 by a pin arrangement (not shown); and the end 18 of the trailer 10 is raised by means of the jack assembly 19. A lock pin (not shown) preferably locks the jack member 19 in its raised position. During loading, the semi trailer 10 will be supported largely by the rear axle of the two-axle arrangement 16.

In the embodiment shown, the trailer's rear end 15 has a bumper 21 which prevents the trailer 10 from being lowered completely to ground level 71. In this situation, small ramps (not shown) can be utilized during the loading and unloading processes. The ramps may be carried beneath the semi trailer 10 by a suitable support structure arrangement.

In the preferred embodiment, the sides 61 of the trailer 10 are made of continuous plates, so as to be of monowall construction. The trailer sidewalls 61 are on the order of 0.160 of an inch in thickness and are made of aluminum. At spaced intervals along the trailer sidewalls 61 are vertical support members or posts (not shown) to join the adjacent plates and provide rigidity and strength. Alternatively, the trailer sidewalls 61 may be of a sheet and post or fiberglass reinforced plywood design. It will be appreciated that sidewall structures for semi trailers are well known in the transportation industry and therefore a detailed description of the trailer's decking and support structure will not be provided herein. However, additional structural support is obtained from suitable cross members (not shown) 50 interconnected to the roof of the trailer 10; rail frame members 60; and cross members 26 located beneath the trailer floor 25.

The trailer 10 includes a flooring 25, preferably made of oak. The flooring 25 serves to support the freight articles and/or automobiles 27 being carried, and also serves to prevent splash or road dirt from reaching the freight and automobiles. As shown in FIG. 5, a continuous underfloor 24 is also provided and is preferably formed of transversely corrugated sheet metal. The wood flooring 25 is suitably secured to the underside of the cross frame members 26 and the side rail frame members (not shown), as by bolts, welding, etc.

The present invention has particular application for carrying automobiles. As illustrated in FIG. 1, two levels of automobiles are carried in the semi trailer 10. The trailer 10 can accommodate six standard sized automobiles or eight sub-compact automobiles. The upper level of automobiles 27 is supported by movable tracks 28. Preferably, the tracks 28 are continuous. The tracks 28 are moveable between an upper and lower position by means of a plurality of pivoting support arms 29, which move as illustrated by the arrows 30 in FIG. 2.

As illustrated by the top plan view of FIG. 3 and the sectional view of FIG. 4, the pair of parallel tracks or runways 28 run in the longitudinal direction of the trailer 10. It should be noted that the plan view of FIG. 3, for purposes of simplicity, eliminates a detailed depiction of some of the support structure of the present invention. The tracks 28 have a generally horizontal upper surface 32 upon which the tires of the automobiles 27 are supported. In the preferred embodiment, the tracks 28 are approximately 15 inches or more in width. It is to be understood that the vertically moveable tracks 28 could be of many different configurations in order to support different types of cargo at an elevated level. Thus, the tracks 28 can be considered to be a deck section of any desired size and configuration. Indeed, it is within the scope of the present invention to raise an entire, continuous floor structure so as to provide an elevated storage area.

As illustrated in FIGS. 4 and 10, the upper surface 32 of the deck section or tracks 28 is flush with the upper surface 72 of the floor 25 when the tracks 28 are in their lower position. Thus, the deck section or tracks 28 themselves partially floor the trailer structure and, when handling dry freight, may be employed to support the cargo. FIG. 10 illustrates the appearance of the interior of the trailer 10 when the tracks 28 are in their lower position, and a smooth, continuous floor is formed for general freight.

As shown in FIGS. 1 and 2, the preferred embodiment of the trailer 10 has a substantially horizontal surface for the lower level of automobiles, and a substantially horizontal track surface for the upper level of automobiles, with the exception of a downwardly inclining track portion 31 proximate the front end 18 of the trailer 10. The inclined track 31 is achieved as a result of a shortened length of the support arms 29 which are toward the front end 18 of the trailer. The inclined surface 31 provides sufficient clearance for the upper forward automobile despite a shorter inside height of the trailer 10 proximate the front end 18 of the trailer relative to the rear end 15 of the trailer 10. This difference in interior height results from a preferred embodiment wherein smaller than standard trailer wheels 16 are utilized in order to increase the interior height of the rear end of the trailer 10 while still remaining within applicable height limitations. When a standard tractor 11 is utilized, however, the tractor's wheels 14 are larger in size relative to the specialized, small wheels 16. It is to be understood that the deck section 28 could be inclined at any desired angle(s) in order to most efficiently carry a particular-sized cargo.

As shown in FIG. 2, the support arms 29 are positioned proximate each of the sidewalls 61, with pairs of support arms 29 being oppositely opposed from each other. In the preferred embodiment, the pivoting support arms 29 are spaced approximately 60 inches from each other, so that there are a total of approximately seven pairs of support arms 29 in the trailer 10. In the preferred embodiment, the height of the support arms 29 is approximately 55-59 inches. The floor 25 has cutout portions which correspond to the size and configuration of the support structure for the upper level of automobiles. Thus, there are a pair of longitudinal cutout portions 33 and 34 (FIG. 9) which correspond to the longitudinal tracks 28 and support arms 29 respectively. In addition, there are transverse cutout portions 35 to accommodate the cross plates 62 which are intermediate the tracks 28 and provide additional rigidity and support. In the preferred embodiment, the cutout portions 33, 34 and 35 are fitted with suitable support pans 37, 38 and 39 respectively. The pans 37, 38 and 39 line the surface of the cutout portions 33, 34, 35 respectively and are preferably made of aluminum. As illustrated in FIG. 4, the pans 37, 38, 39 are U-shaped in cross section, with the pans 37, 38 running in the longitudinal direction of the trailer, and the pans 39 running in the transverse direction. The pans 37, 38, 39 are suitably secured to the floor 25 and to the cross members 26 by screws (not shown) or other suitable connection means. In the preferred embodiment, the floor 25 is approximately 1½ inches in height.

Because the height of the track 28 and pan 37 is greater than the height of the floor 25, spacer members 40 are preferably positioned between the underside of the floor 25 and the upper surface of the cross members 26. These spacers are approximately ½ inch in height in the preferred embodiment. As illustrated in FIGS. 4 and 5, the spacers 40 run in the transverse direction of the trailer 10 and are preferably interconnected to the cross beams 26. The combined height of the floor and pan is approximately 2 inches. It is to be understood that different sizes than those stated above may be utilized, and that it may be possible to eliminate the spacers 40 and allow the tracks 28 to rest directly upon the cross members 26.

A suitable lift means is employed to raise the deck section 28 between its floor-level position and its elevated position. In the preferred embodiment, the lifting means comprises the support arms 29 attached to the tracks 28. The operation of the support arms 29 will be described with reference to FIG. 6, which illustrates a support arm 29 and cylinder 23 in both their lower, horizontal position, and in their upper, elevated position. Each support arm 29 preferably includes two interconnected arms: an upper arm 41 and a lower arm 42. The arms 41, 42 are in a telescoping relationship with the lower arm 42 being slidably insertable within the upper arm 41. In the preferred embodiment, the arms 41, 42 are square tubes. At the lower end of the support arm 29 is a fulcrum point 44, which is a pivotal connection of the support arm 29 with the trailer frame 60.

Figure 7:
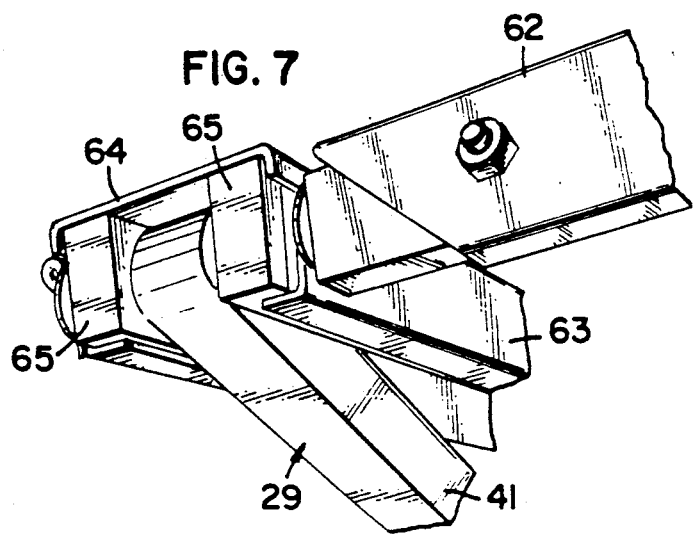
FIG. 7 is perspective, detailed view of the connection between the support arm and the track.
Figure 8:
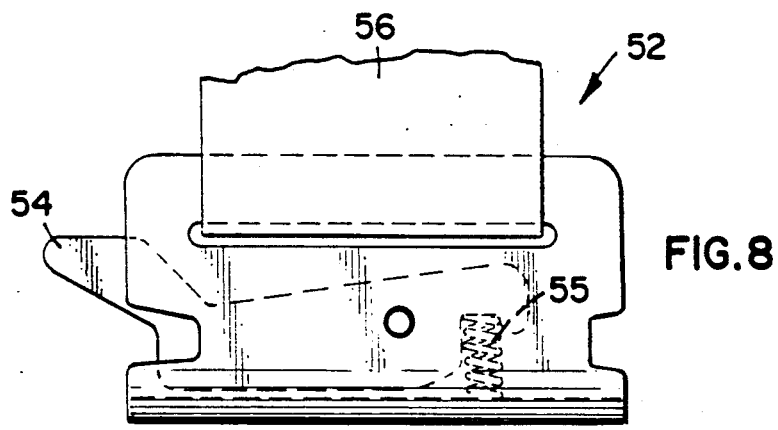
FIG. 8 is a detailed view of a tie-down fitting utilized with the present invention.
Figure 9:
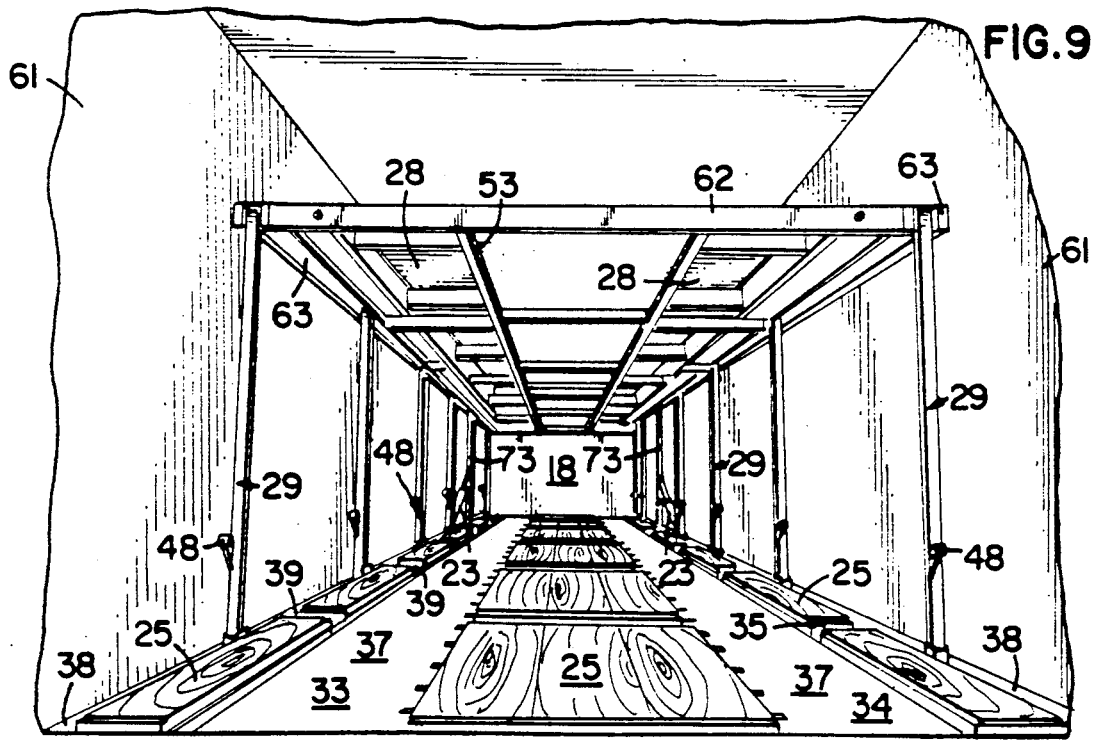
FIG. 9 is a perspective view of the trailer in its upper position, as viewed from the rear.

The upper end of the upper arm 41 is suitably connected to the track 28 at connection point 45. FIG. 7 illustrates the pivotal connection 45 between the upper arm 41 and the frame 63. The pair of longitudinal frame members 63 are located proximate the trailer sidewall 61, as illustrated in FIG. 9. The outer frame members 63 are interconnected to the tracks 28 by means of cross bars 62. Thus, when the support arms 29 raise and lower the outer frames 63, the tracks 28 are also raised and lowered. It is to be understood that the tracks 28 could be formed as a unitary, continuous structure with the frame member 63. As shown in FIG. 7, the support frame 63 has a U-shaped configuration, wherein a pair of legs 65 are interconnected by a central member 64. The central member 64 has a flat upper surface which is utilized when dry freight is hauled. The upper end of the upper arm 41 has an aperture through which a pin (not shown) is inserted so as to couple the upper arm 41 to the legs 65 of the frame 63 in a pivotal arrangement.

Suitable power means are provided in order to move the support arms 29 and deck section 28 between their lower and upper positions. In the preferred embodiment, the power means comprises a pair of hydraulic cylinder assemblies 23, one on each side of the trailer 10 as illustrated in FIG. 9.

The cylinders or rams 23 are located beneath the surface of the floor 25 when the deck section 28 is in its lowered position. In the preferred embodiment, the cylinders 23 are located proximate the central bay section of the trailer 10, and are preferably interconnected to one pair 73 (see FIG. 9) of the central support arms 29. The upper end of the central support arm is pivotally interconnected to the end of the piston 46. Because all of the support arms 29 are interconnected to each other by the tracks 28, the force upon the central support arm assembly 73 causes upward movement of all of the remaining support arms 29 in the trailer 10.

Figure 6:
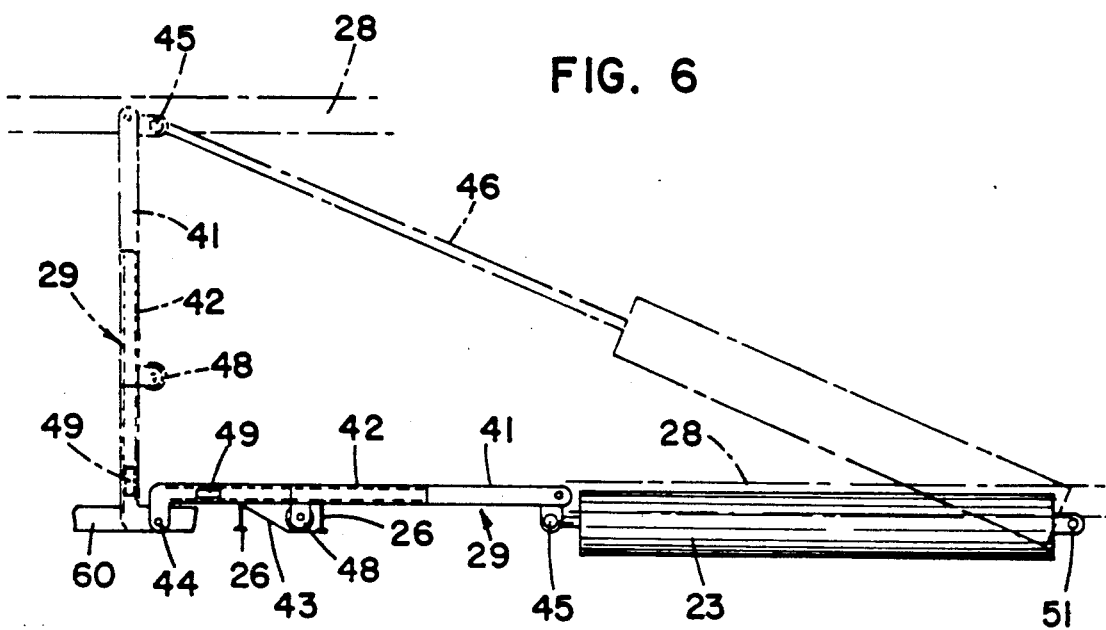
FIG. 6 is a side, diagrammatic view of a support arm and cylinder of the present invention, illustrating both their upper and lower positions.

The lifting means also includes a sliding member 48 which is interconnected to each support arm 29, as illustrated in FIG. 6. The sliding member 48 is a wheel in the preferred embodiment. The wheel 48 rolls upon and cooperates with an inclined surface or ramp 43 when the support arm 29 is proximate its lowered position. The ramp is formed within the cutout portion 38 (see FIG. 9) in the trailer floor, and the position of the ramps 43 are illustrated by the plan view of FIG. 3. With this design, the force required to initiate upward movement of the support arms 29 is minimized.

In the position of the support arm 29 illustrated by the horizontal solid lines of FIG. 6, the track 28 and support arm 29 are in their lowermost position, in which the top surfaces of the track 28 and support arm 29 ar flush with the flooring 25. As the piston 46 moves toward the left (as viewed in FIG. 6), the upper arm 41 also moves toward the left, thereby pushing the sliding structure 48 up the ramp 43 and causing upward movement of the support arm 29. This lateral leftward movement continues until the upper arm 41 abuts against a stop member 49, as illustrated in FIG. 6. The overall length of the support arm 29 decreases until the upper arm 41 reaches the stop 49. In the preferred embodiment, the stop 49 comprises a pair of plates welded to the outside of the lower arm 42.

As the piston 46 continues to withdraw from the cylinder, the cylinder assembly 23 is rotated upwardly, and the support arm 29 is pushed to its raised position. The phantom lines of FIG. 6 illustrate the uppermost vertical position of the support arm 29 and cylinder assembly 23, in which the upper level of automobiles 17 are positioned at the upper level of the trailer 10 (see FIG. 1).

A central portion of the trailer bottom 50 is preferably lowered in order to accommodate the cylinder 31. In addition, the underside of the trailer preferably supports suitable numbers of tanks for holding air and hydraulic fluid. A storage area 70 may also be provided, as shown in FIGS. 1 and 2. It should be understood that the present invention could also be designed with a single cylinder which would apply force against the lift means so as to similarly raise the support arms 29 and tracks 28. To support the cylinders 23, a pair of relatively deep cutout portions and pans in the floor 25 are provided, and the cylinders 23 rest upon a suitable support structure. One end of the cylinders 23 has a pivotal connector 51 with respect to the cylinder frame 74.

Both the upper and lower automobiles are held in position by suitable clamping means or hold-down chains. In the preferred embodiment, there are perforations 53 in the track 28 for the upper level of vehicles. The perforations 53 are preferably formed in the side of the track 28. The pans 37 within the trailer's floor cutouts are also provided with perforations 66 to enable tiedown of the lower level of cars. A suitable fitting 52 such as the one illustrated in FIG. 10 is inserted within the rectangular perforations 53 or 66. Preferably, the fitting 52 is spring actuated, having a detent 54 and spring 55. The clip 52 is interconnected to a strap 56, preferably made of a nylon material, which is secured to the car's chassis. In this manner, the automobiles 17 are securely tied to the tracks 28.

In the preferred embodiment, the working hydraulic oil for the cylinders 23 is provided by an air over oil hydraulic pump (not shown) which is interconnected to a source of air pressure on the tractor 11. With a standard tractor, the tractor's air supply can be used to run the hydraulic cylinders 23. Utilization of this standard equipment necessitates approximately ten to fifteen minutes to raise the support arms 29 and tracks 28, with shortened times being available with more powerful equipment. In the preferred embodiment, a single stage hydraulic cylinder with a reversing cycle is utilized. Preferably, the hydraulic cylinder 23 has approximately a 75,000 pound capacity.

In the preferred embodiment, a control box (not shown) is provided to initiate movement of the support arms 29. An emergency stop button is also provided on the control box.

When it is desired to use the trailer 10 for hauling automobiles, the lower level of automobiles 17 are driven within the trailer 10 so that the tires are positioned upon the tracks 28. The automobiles 17 are tied down with respect to the tracks 28. It should be noted that when the upper level of cars is loaded, the forward car should be positioned slightly back from the forward wall of the trailer 10, because raising the tracks 28 causes forward movement of the tracks 28, as illustrated in FIG. 2. At that time, the tracks 28 are lifted to their upper position by activation of the cylinders 23. A track extension 75 (shown in FIG. 2) may be suitably connected to the rear end of the upper track 28 proximate the rear 15 of the trailer 10. When the automobiles are in their upper position, the lower level of automobiles are then driven into the trailer 10. When the lower level of cars enters the trailer 10, the automobile tires are positioned with the pans 37.

When it is desired to use the trailer 10 for hauling dry freight, the support arms 29 and tracks 28 are positioned in their lower position, so as to be flush with the surface of the floor 25. This provides a smooth, continuous surface for accommodating the dry freight, as illustrated in FIG. 10.

Accordingly, the present invention enables loading of automobiles 17 through the rear end of an enclosed semi trailer and enables hauling the automobiles 17 in two levels. On the return trip or backhaul, the support arms 29 and tracks 28 can be lowered so as to accommodate conventional cargo to be transported. In addition, the sliding assembly 17, as described above, allows for ground-level loading and unloading. In the preferred embodiment, the automobiles are loaded from the rear end of the trailer 15 and face in the forward direction, as illustrated. Unloading is performed in the reverse order to the loading, as described above.

It is to be understood that even though the above numerous characteristics and advantages of the invention have been sent forth in the foregoing description, together with details of the structure and function of the invention, the disclosure is illustrative only, and changes may be made in detail, especially in matters of shape, size and arrangement of parts within the principles of the invention, to the full extent indicated by the broad, general means of the terms in which the amended claims are expressed.

What is claimed is:

1. A system for raising and lowering a deck section of a trailer, comprising:
   a) a trailer floor having cutout portions which are sized and configured to correspond to the shape and configuration of said deck section;
   b) lift means for raising and lowering the deck section, said lift means being constructed and arranged for movement between a first position at which said deck section is lowered and flush with said trailer floor and a second position at which said lift means is vertically displaced from said trailer floor to support said deck section in a raised position, wherein a continuous flush surface is formed by said trailer floor and said deck section when said deck section is in its first position, and an upper and a lower storage level are formed when said deck section is in its second position; and
   c) power means for selectively moving said lift means between the raised and lowered positions.

2. A system according to claim 1 wherein said power means comprises a piston member and a cylinder member, the piston member being movably attached to the cylinder member and to the lift means so as to selectively move said lift means between the first and second positions, said power means being positioned completely beneath the level of said trailer floor when said lift means is in its lowered position.

3. A system according to claim 1, wherein the lift means comprises a plurality of support arms, each support arm including:
   a) an upper arm attached to said deck section and interconnected with said power means; and
   b) a lower arm which is slidably attached to said upper arm and which is pivotally interconnected to a trailer frame member to allow pivotal movement of said support arms when said deck section is moving between its raised and lowered positions.

4. A system according to claim 3, further comprising a sliding member interconnected to said support arm, said sliding member cooperating with an inclined surface when said lift means is proximate its lowered position.

5. A system according to claim 1, wherein said power means is pneumatically operated.

6. A system according to claim 1, wherein said power means is hydraulically operated.

7. A system according to claim 1, wherein said deck section comprises a pair of parallel, longitudinal tracks configured to support a plurality of vehicles thereon.

8. A system according to claim 3, wherein each support arm includes an upper arm and a lower arm attached in a telescoping arrangement, wherein said upper and lower arms slide relative to each other as said deck section begins its ascent to said raised position.

9. A system according to claim 7, further comprising a tie-down strap having a clip member which is insertably attached within a perforation in said track.

10. A system according to claim 1, further comprising support pans which are positioned within said cutout portions.

11. A system according to claim 1, wherein said trailer floor has cutout portions which are sized and configured to correspond to the shape and configuration of said support means.

* * * * *

UNITED STATES PATENT AND TRADEMARK OFFICE
CERTIFICATE OF CORRECTION

PATENT NO. : 5,051,046

DATED : September 24, 1991

INVENTOR(S) : David D. Oren

It is certified that error appears in the above-identified patent and that said Letters Patent is hereby corrected as shown below:

On the title page: under the heading "References Cited", add the subheading "FOREIGN PATENT DOCUMENTS" and insert under the new heading the reference to 2,107,274A, dated 4/1983, United Kingdom.

Signed and Sealed this

Thirteenth Day of July, 1993

*Attest:*

MICHAEL K. KIRK

*Attesting Officer*  Acting Commissioner of Patents and Trademarks